United States Patent [19]

Kumagaya

[11] 4,175,482

[45] Nov. 27, 1979

[54] AUTOMATIC HIGH-PRESSURE FLASH COOKER

[75] Inventor: Teruo Kumagaya, Iida, Japan

[73] Assignee: Asahimatsu Koridofu Kabushiki Kaisha, Nagano, Japan

[21] Appl. No.: 941,792

[22] Filed: Sep. 12, 1978

[30] Foreign Application Priority Data

Sep. 22, 1977 [JP] Japan .................. 52/114059

[51] Int. Cl.² .................................... A47J 27/04
[52] U.S. Cl. ............................ 99/330; 99/366; 99/516
[58] Field of Search ........... 99/366, 409, 407, 483, 99/330, 325, 463, 474, 477, 516; 126/369

[56] References Cited

U.S. PATENT DOCUMENTS

| 3,408,920 | 11/1968 | Smith, Jr. | 99/409 |
| 3,744,474 | 7/1973 | Shaw | 99/330 |
| 3,790,391 | 2/1974 | Bolleter et al. | 99/330 |
| 3,814,901 | 6/1974 | Morhack | 126/369 |

FOREIGN PATENT DOCUMENTS

618565  12/1926  France ........................ 99/330

*Primary Examiner*—Billy S. Taylor
*Attorney, Agent, or Firm*—Toren, McGeady and Stanger

[57] ABSTRACT

An automatic high-pressure flash cooker comprising a cylindrically shaped steaming chamber, which is set in a slanted position with its lower end open, and a drain collector which has at its upper end a perforated plate permitting passage of water and is connectable with the open end of the steaming chamber, wherein the steam is supplied to the steaming chamber from the drain collector while the collector is connected with the steam chamber, so as to effect flash cooking of the beans remaining in the steam chamber, with the cooked beans being discharged by releasing the drain collector from the engagement with the steam chamber.

2 Claims, 2 Drawing Figures

AUTOMATIC HIGH-PRESSURE FLASH COOKER

BACKGROUND OF THE INVENTION

The present invention relates to an apparatus for carrying out a short period of heating of beans or grains under high-pressure steam and removing the heated feed material from the machine at the same time that the heating operation is finished.

The present inventor developed a method whereby soybeans are first briefly flash-heated at a high temperature so that the characteristic enzymes present in the soybeans are inactivated, with as little denaturation as possible of the soybean proteins. A Japanese Patent Application, No. Sho 50-133853 discloses "A Method for Improvement of the Flavor of Soybean Processed Foods", and the present invention involves the production equipment relating to that method.

Conventionally, for the cooking of beans, etc., batch-system pressurized cookers (autoclaves) and continuous-system pressurized cookers have been employed, but the present invention is an apparatus which makes possible short-term cooking which can not be carried out in the conventional pressure cookers. The cooking time which is deemed necessary is an operation taking 1 minute or less from the heating through the cooling, and in some cases, only 10 seconds. An apparatus able to satisfy these conditions can not be found among the conventional pressurized cookers.

The present invention will now be described by referring to the accompanying drawings.

DETAILED EXPLANATION OF THE INVENTION

Figure 1:
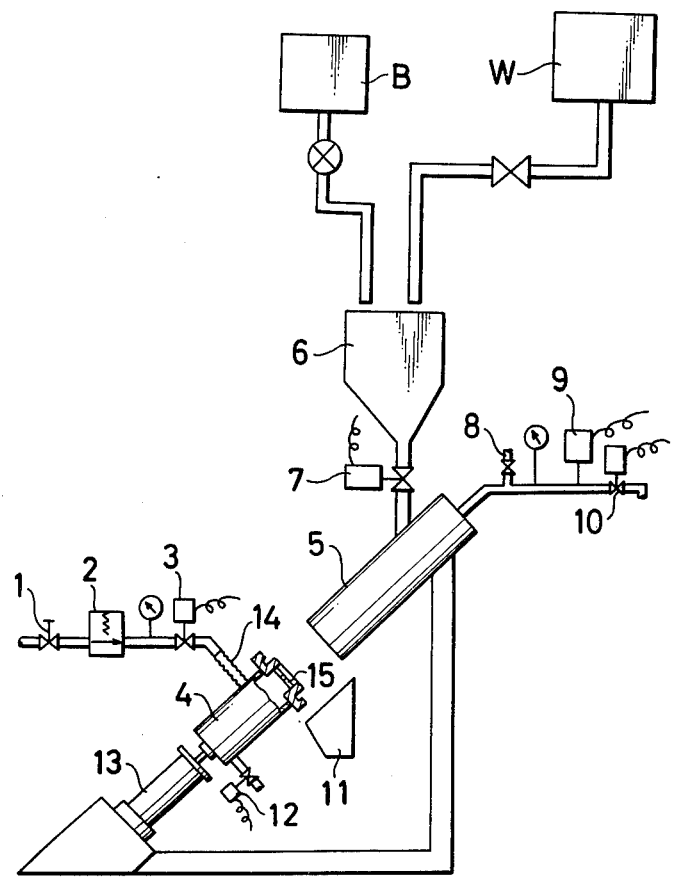
FIG. 1 shows schematically the apparatus according to the present invention.
Figure 2:
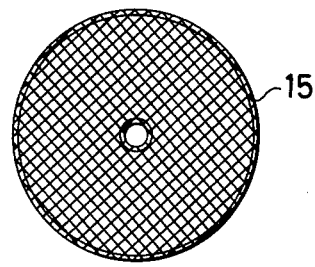
FIG. 2 shows the perforated plate provided at the upper end of the drain collector.

A water supply tank W and a bean storing bin B are installed above a raw material feed hopper 6, so as to supply simultaneously beans and water or selectively either of them into the feed hopper, which is connected with the steaming chamber 5 by an electromagnetic valve 7. The steaming chamber is cylindrical in shape and is set in a slanting position; its upper end is connected with an electromagnetic valve 10, while its lower end is open and connectable with the upper end of the cylindrically-shaped drain collector 4, which is slantly moved by means of a hydraulic cylinder 13 and is tightly connectable with the lower end of the chamber 5 at its upper position and released therefrom at its lower position. A flexible steam supply pipe 14 is attached to the drain collector 4, and a drain valve 12 is installed at the drain collector's bottom end. The upper end of the drain collector 4 is provided with a perforated plate 15 shown in FIG. 2, or it may be provided with a meshwork or a punched plate which permits passage of water and vapor, but does not permit passage of the beans. Thus, the water in the steam chamber flows down through the perforated plate 15 into the drain collector while the beans are retained in the steam chamber while the drain collector is connected with the steam chamber.

The above-mentioned steam supply pipe passes through an electromagnetic valve 3 and connects with the steam source through a valve 1 and a pressure release valve 2. A receiver 11 is placed below the lower end of the steaming chamber.

Next, the operation of the present invention will be explained based on the above structure.

A fixed amount of the raw material, together with water, is released from the feed hopper 6 and dropped into the steaming chamber 5 by the opening of the valve 7. The water flows down through the drain collector 4 and is drained through the drain valve 12. The valve 7 closes at the same time that the raw material delivery to the steaming chamber is completed, and the drain valve 12 is closed when the water has been removed.

Next, the electromagnetic valve 3 opens and high-pressure steam enters. The electromagnetic valve 10 opens and releases the air from the steaming chamber 5 together with the steam entry; the valve 10 closes when the air has been removed. A pressure switch 9 comes into action and the beans in the steam chamber are subjected to vapor cooking for a prescribed time at a prescribed pressure. 8 is a safety valve. This cooking method is different from those employed in conventional high-pressure cooking apparatus in that the raw material is cooked while it is being blown about in the steaming chamber by the steam which is rising from below the material. In the conventional cookers the steam is introduced from above the raw material, and the methods which heat this for a certain period of time are adequate when the cooking time is long. However, in order to successfully carry out extremely short-term cooking and to get uniform cooking, it is best for the steam to be blown in from below so that the cooking is done while the raw material is wafted about in the chamber. With this technique it is possible to carry out the cooking within a very short time period, for example 10 seconds or even less, without any lack of uniformity.

When the cooking is finished, the steam supply valve 3 closes and, at the same time, valve 12 opens and the steam is removed at once. This step shows effectiveness in improving the flavor of soybeans because, for example, the soybean odor, etc., is sent out together with the steam. Simultaneously with the completion of the steam release, the oil cylinder 13 drops downward in its backstroke and valve 7 opens and flushes water into the steaming chamber; this makes possible the rapid cooling and removal of the cooked raw material.

One of the characteristic features of this apparatus is that it is set at a fixed angle, as is evident from the diagram. This is designed in this fashion in order to maximize the speed with which the raw material is removed after the cooking operation. In the case of the conventional continuous type high-pressure cooking machines, etc., mechanical removal of the raw material is accomplished only at the expense of pushing and crushing the raw material, or the removal operation requires a lot of time. In addition, they are afflicted by such drawbacks as uneven heating, and some machines overcook the material. With the mechanism of the present apparatus, the raw material falls naturally due to gravity, and in addition, the wash water which flows from above makes possible the accurate control of the heating time and, moreover, completely prevents any of the cooked material from remaining in the steaming chamber. Once the removal of the raw material has been completed, the oil cylinder 13 goes into its forward stroke and the preparations for the next cycle are complete.

Therefore, the apparatus of the present invention has been designed so that it can carry out these operations both automatically and continuously. With the use of this equipment it is possible, for example, to supply truly superior-quality cooked soybeans for use in the production of tofu and miso having little of the soybean odor.

What is claimed is:

1. An automatic high-pressure flash cooker comprising a cylindrically-shaped steaming chamber which is set in a slanted position with its lower end open, and a drain collector which has at its upper end a perforated plate permitting passage of water and is connectable with the open end of said steaming chamber, said steaming chamber being communicated with a feed hopper for supply of water and beans, said drain collector being communicated with a vapor source and provided with an opening for exhausting water therefrom.

2. The apparatus according to claim 1, in which the drain collector is movable slantly by means of a hydraulic cylinder so as to be tightly connectable with the lower end of the steaming chamber.

* * * * *